UNITED STATES PATENT OFFICE.

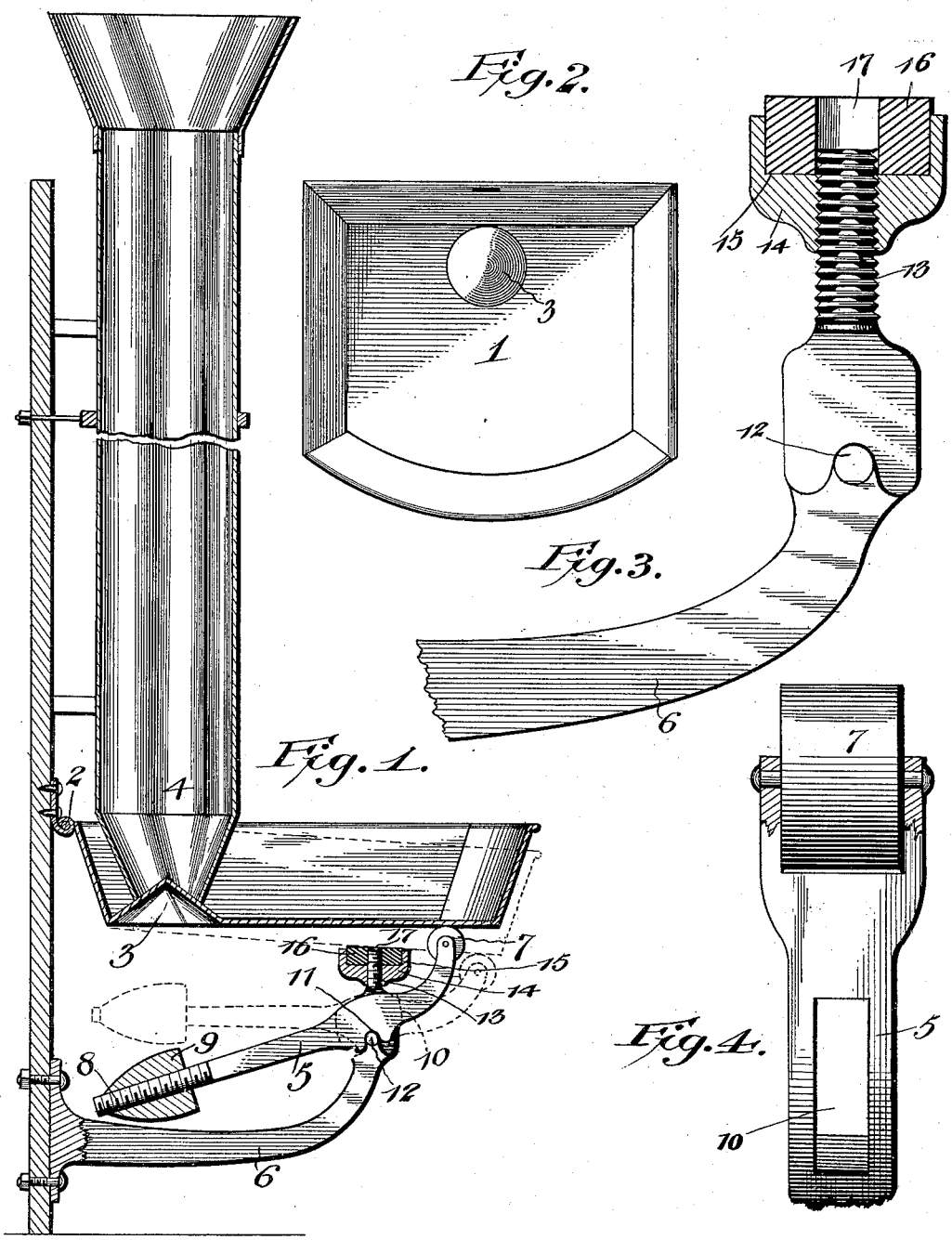

WILLIAM H. WELLSTEED, OF BROMPTON, MICHIGAN.

FEED-TROUGH.

SPECIFICATION forming part of Letters Patent No. 634,927, dated October 17, 1899.

Application filed October 1, 1898. Serial No. 692,375. (No model.)

*To all whom it may concern:*

Be it known that I, WILLIAM H. WELLSTEED, a citizen of the United States, residing at Brompton, in Baldwin township, in the county of Delta and State of Michigan, have invented a new and useful Feed-Trough, of which the following is a specification.

The invention relates to improvements in feed-troughs.

The object of the present invention is to improve the construction of feed-troughs and to provide a simple, inexpensive, and efficient device which will automatically feed the grain to a horse or other animal in small quantities to avoid too-rapid eating and insufficient mastication.

A further object of the invention is to enable the feeding of the grain to be regulated, so that an animal will be compelled to eat slowly and digest the grain and be prevented from obtaining a large mouthful and scattering it around its stall.

The invention consists in the construction and novel combination and arrangement of parts, as hereinafter fully described, illustrated in the accompanying drawings, and pointed out in the claims hereto appended.

In the drawings, Figure 1 is a vertical sectional view of a feed-trough constructed in accordance with this invention. Fig. 2 is a plan view of the trough. Fig. 3 is a detail sectional view of the bracket. Fig. 4 is a detail view of the outer end of the lever.

Like numerals of reference designate corresponding parts in all the figures of the drawings.

1 designates a feed-trough hinged at its back at 2 to a suitable support and provided with a cone 3, adapted to extend into a supply-tube 4, as illustrated in Fig. 1 of the accompanying drawings, to close the lower end of the tube and shut off the supply, the feed-trough being adapted to be depressed, as illustrated in dotted lines in Fig. 1, to open the lower end of the supply-tube and permit a small quantity of grain to escape therefrom. The supply-tube 4, which may be of cylindrical or other shape, is preferably tapered at its lower end, as shown; but it may be straight, if desired, and the cone 3 may also be dispensed with. The upper end of the supply-tube is flared to form a hopper; but the shape may be modified as desired.

The device is automatically operated by a horse or other animal in eating or feeding, and the trough, which is slightly depressed by the animal in attempting to obtain some of the grain, is returned as soon as the animal lifts its head sufficiently to relieve the trough of pressure. The bottom of the trough is held normally against the lower end of the supply tube or chute by means of a weighted lever 5, fulcrumed between its ends on a bracket 6 and having its outer end extended upward and engaging the lower face of the bottom of the trough. The outer end of the lever is bifurcated, as clearly shown in Fig. 4 of the accompanying drawings, to receive an antifriction-wheel 7, which directly engages the bottom of the trough and prevents any friction or wear. The inner end of the lever is threaded at 8 and receives an adjustable weight 9, which is adapted to be moved longitudinally of the lever to counterbalance the trough properly; but it may be adjustably secured to the lever in any other suitable manner, such as by means of a set-screw. The lever is provided between its ends with an opening 10, through which the upper portion of the arm or bracket 6 extends, and notches 11 are provided at opposite sides of the opening to receive the pivot 12, upon which the lever is fulcrumed. The outer extremity of the arm or bracket is disposed vertically and is exteriorly threaded at 13 to receive a nut 14, which is provided at its top with a recess or cavity 15. The nut, which receives a block 16 of rubber or other suitable material to form a cushion, is capable of vertical adjustment to limit the downward movement of the trough and regulate the quantity of feed escaping from the supply tube or chute, so that the grain will be fed slowly to an animal to cause it to masticate and digest the feed thoroughly and at the same time to prevent the animal from obtaining a large mouthful and scattering it over the stall. The elastic block or cushion 16, which is provided with a central opening 17 for the passage of the screw, forms a stop for the trough and limits the downward movement of the same.

The bracket, which extends horizontally from the wall or support, has its horizontal portion located beneath the weighted end of the lever, which may be arranged to rest upon the said bracket to relieve the trough of strain when there is no feed in the tube or hopper.

The invention has the following advantages: The device, which is simple and comparatively inexpensive in construction, is positive and reliable in operation and is automatically operated by a horse or other animal in feeding, and it will cause the grain to escape from the tube or hopper into the feed-trough in small quantities, so that a horse or other animal can get but little feed in its mouth at a time, thereby compelling it to eat slowly and digest the grain. At the same time the device will prevent an animal from wasting the grain by obtaining a large mouthful and scattering it around its stall. The use of the device will result in a great saving of feed, not only because of the effectiveness of the feed eaten by an animal, but also from the waste which is prevented.

Changes in the form, proportion, and minor details of construction, such as varying the size and shape of the supply tube or hopper and the arrangement of the lower end with relation to the trough and the omission of the cone, may be resorted to without departing from the spirit or sacrificing any of the advantages of this invention.

What is claimed is—

1. In a device of the class described, the combination of a tube or hopper, a depressible trough normally closing the tube or hopper, a support, a lever fulcrumed on the support and engaging the trough to hold the same elevated, and a stop adjustably mounted on the said support and located above the lever and arranged to limit the movement of the trough, substantially as described.

2. In a device of the class described, the combination with a hopper, and a depressible trough closing the hopper, of a bracket or support located beneath the trough, a weighted lever fulcrumed on the bracket or support and engaging the trough to hold the same normally elevated, and a combined cushion and stop adjustably mounted on the bracket or support, located above the lever and adapted to limit the downward movement of the trough 7, substantially as described.

3. In a device of the class described, the combination of a tube or hopper, a depressible trough, an arm or bracket located beneath the trough, a lever fulcrumed between its ends on the arm or bracket and provided at one end with a weight, and an antifriction-roller mounted on the other end of the lever and engaging the bottom of the trough, substantially as described.

4. In a device of the class described, the combination of a tube or hopper, a depressible trough, means for holding the trough normally elevated, a threaded support located beneath the trough, a nut arranged on the threaded support and having a cavity or recess at its top, and a cushion arranged in the cavity or recess of the nut and adapted to be engaged by the trough, substantially as described.

5. In a device of the class described, the combination of a tube or hopper, a depressible trough, an arm or bracket located beneath the trough provided with a pivot and having an upper threaded portion, a lever having an opening to receive the arm or bracket and fulcrumed on the pivot thereof, the outer end of the lever being provided with an antifriction-roller to engage the trough, and the inner end having an adjustable weight, and a nut mounted on the threaded portion of the arm or bracket and limiting the depression of the trough, substantially as described.

6. A device of the class described comprising a hopper, a depressible trough, a bracket extending horizontally from a suitable support and having its outer portion projected upwardly, and a weighted lever fulcrumed between its ends on the outer end of the bracket and having one end engaging the trough, its other end being located above the horizontal portion of the bracket and adapted to be supported by the same, substantially as described.

7. A device of the class described comprising a hopper, a depressible trough projecting horizontally from a suitable support and having its outer end extending upwardly, a lever disposed longitudinally of the bracket and fulcrumed between its ends on the outer end of the same, the outer end of the lever engaging the bottom of the trough and the inner end of the lever being arranged over the horizontal portion of the bracket, and a stop supported by the bracket and located above the lever at a point above the ends thereof, and arranged to limit the downward movement of the trough, substantially as described.

In testimony that I claim the foregoing as my own I have hereto affixed my signature in the presence of two witnesses.

WILLIAM H. WELLSTEED.

Witnesses:
ALFRED P. SMITH,
C. A. CHASE.